United States Patent
Denman

(10) Patent No.: US 12,391,187 B1
(45) Date of Patent: Aug. 19, 2025

(54) CONVERTIBLE CARRIER RACK AND PLATFORM

(71) Applicant: Crooked Cedar Designs, LLC, Troy, VA (US)

(72) Inventor: Kevin L. Denman, Troy, VA (US)

(73) Assignee: Crooked Cedar Designs, LLC, Troy, VA (US)

( * ) Notice: Subject to any disclaimer, the term of this patent is extended or adjusted under 35 U.S.C. 154(b) by 0 days.

(21) Appl. No.: 19/041,437

(22) Filed: Jan. 30, 2025

(51) Int. Cl.
*B60R 9/045* (2006.01)

(52) U.S. Cl.
CPC .................................. *B60R 9/045* (2013.01)

(58) Field of Classification Search
CPC ........... B60R 9/04; B60R 9/045; B60R 9/055; B60R 9/058; A47B 3/0803
See application file for complete search history.

(56) References Cited

U.S. PATENT DOCUMENTS

| | | |
|---|---|---|
| 1,108,326 A | 8/1914 | Brown et al. |
| 1,109,406 A | 9/1914 | Dolge |
| 1,530,719 A | 3/1925 | Harris |
| 2,024,431 A | 12/1935 | Corduan |
| 2,546,816 A | 3/1951 | Benvissuto |
| 2,708,613 A | 5/1955 | Heckman |
| 2,721,681 A | 10/1955 | Thomas |
| 2,831,739 A | 4/1958 | Fryckholm |
| 2,948,576 A | 8/1960 | Ball |
| 2,965,424 A | 12/1960 | Baney |
| 3,009,615 A | 11/1961 | Baxter |
| 3,028,609 A | 4/1962 | Tolf |
| 3,057,669 A | 10/1962 | Rogers |
| 3,512,620 A | 5/1970 | Bell et al. |
| 3,731,859 A | 5/1973 | Bean, Jr. |
| 4,066,197 A | 1/1978 | Nobbs et al. |
| 6,705,234 B1 | 3/2004 | Miller et al. |
| 11,904,813 B1 * | 2/2024 | Denman ................. B60R 9/045 |
| 12,202,442 B1 | 1/2025 | Denman |
| 2005/0241550 A1 | 11/2005 | Neunzert et al. |
| 2010/0058958 A1 | 3/2010 | Christian et al. |
| 2016/0270522 A1 | 9/2016 | Winter et al. |
| 2019/0298054 A1 | 10/2019 | Clegg et al. |

OTHER PUBLICATIONS

International Searching Authority/USPTO, International Search Report and Written Opinion, International Patent Application No. PCT/US2024/034448, Jul. 15, 2024.

* cited by examiner

*Primary Examiner* — Brian D Nash
(74) *Attorney, Agent, or Firm* — Williams Mullen; Thomas F. Bergert

(57) ABSTRACT

Embodiments of the present disclosure provide a convertible carrier rack and platform including a platform frame, a front rail including a pair of front rail segments, and a back rail including a pair of back rail segments, wherein the front and back rail segments are rotatable between a wall position for operation in a carrier mode and a leg position for operation in a table-type mode. Embodiments include one or more cross beams secured to a bottom side of the platform frame, wherein the cross beam can extend beyond a front face and a back face of the platform frame. Embodiments include an arrangement of rail segments that provides a secure nested arrangement in the wall position and a stable arrangement in the leg position, without over-rotation.

20 Claims, 4 Drawing Sheets

CONVERTIBLE CARRIER RACK AND PLATFORM

TECHNICAL FIELD

The present disclosure relates to transportation, and more particularly to a convertible carrier rack and platform for use in travel and outdoor activities.

BACKGROUND AND SUMMARY

Vehicles for transportation have inherently limited cargo carrying capacity based on vehicle size and external cargo carrying ability. External cargo transport typically involves roof-mounted or trailer-mounted devices. Unfortunately, people desiring to participate in land-based travel to outdoor activity areas for camping, hiking, tailgating or other activities, are limited in how much gear can be transported safely and effectively to the desired activity area. For instance, it is often highly desirable to have a flat surface table-type device to use as a work area, a dining surface or other desired use. However, one cannot always bring such a desired object to the activity location due to space constraints, even with external cargo carrying ability.

Present technology solutions are focused on carrying cargo or creating a freestanding table style workspace, but not both. However, there is a need for efficiently transporting cargo external to a vehicle in such a way that the cargo carrying device can be converted into a freestanding table-type platform for use after the vehicle has arrived at the desired destination. Embodiments of the present disclosure solve the above problems by providing a single convertible apparatus operable as both a carrier rack and a platform.

The present disclosure relates to a device that can provide a user with both supplemental cargo carrying ability, and with a flat, stable workspace by use of the same device. This negates the need to carry multiple devices to achieve these distinctly different goals that are often both required in the same activity. The device can be employed in many applications, with a particular application as an automotive attachment to replace a roof or trailer cargo rack, where the cargo rack can be manipulated to function as a type of table.

Embodiments of the present disclosure include a flat surface with rails for the purpose of carrying cargo while attached to a vehicle, carried, or somehow otherwise transported. In various embodiments, one or more rails can pivot, rotate or detach and re-attach so as to convert to legs in order to form a table by use of the same flat surface. In various embodiments, one or more rails can contact the bottom of the platform or a platform frame to provide support and stability to the device while in table configuration.

Various uses of the presently described device include camping, sporting events, construction/trades and other uses where a versatile, convertible cargo carrier and table may be employed.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a rail segment may encompass one or more rail segments, reference to a connector may encompass one or more connectors and so forth.

Figure 1:
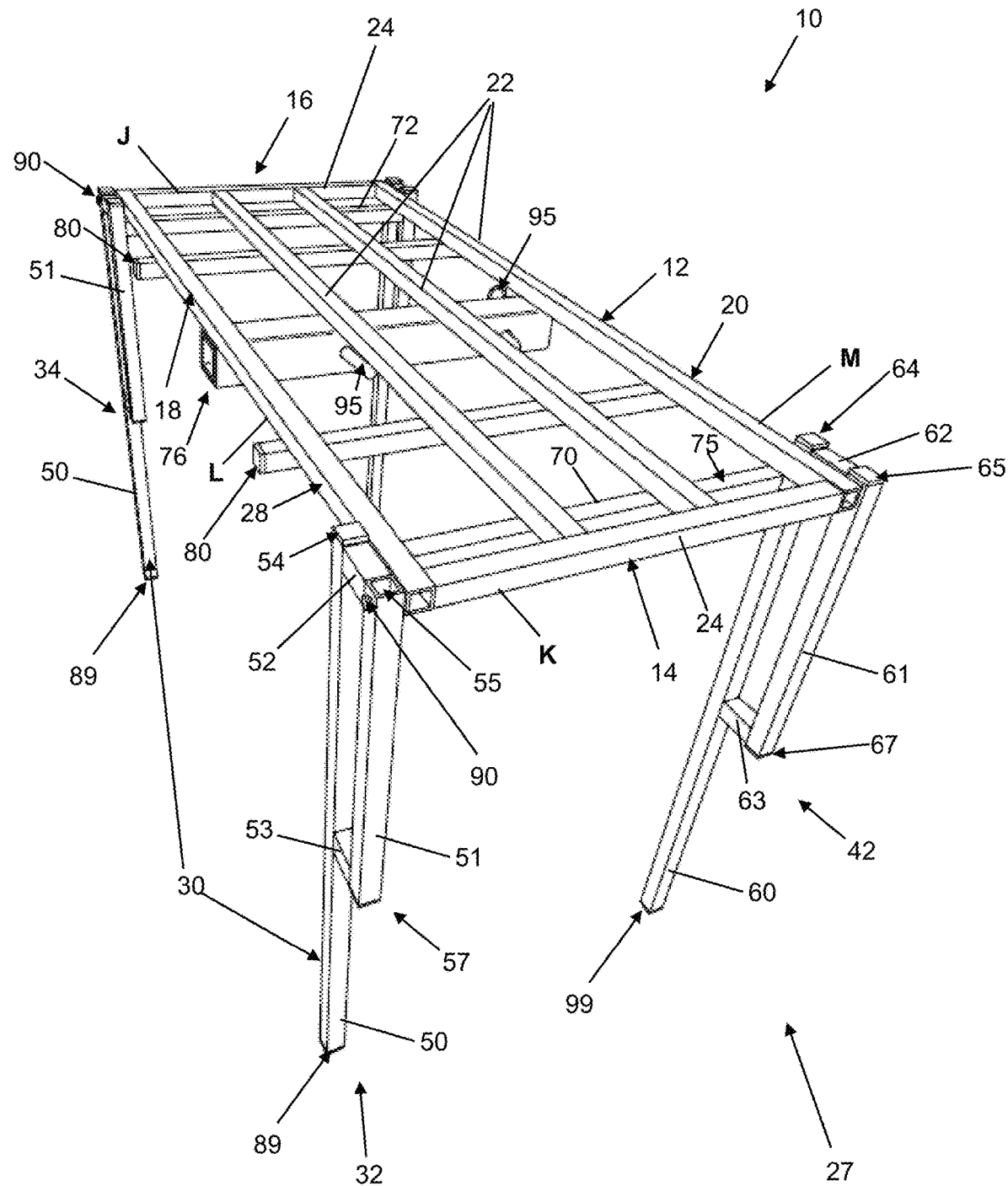
FIG. 1 is a left front top perspective view of a device according to embodiments of the present disclosure, wherein the rail segments are in the table position.
Figure 2:
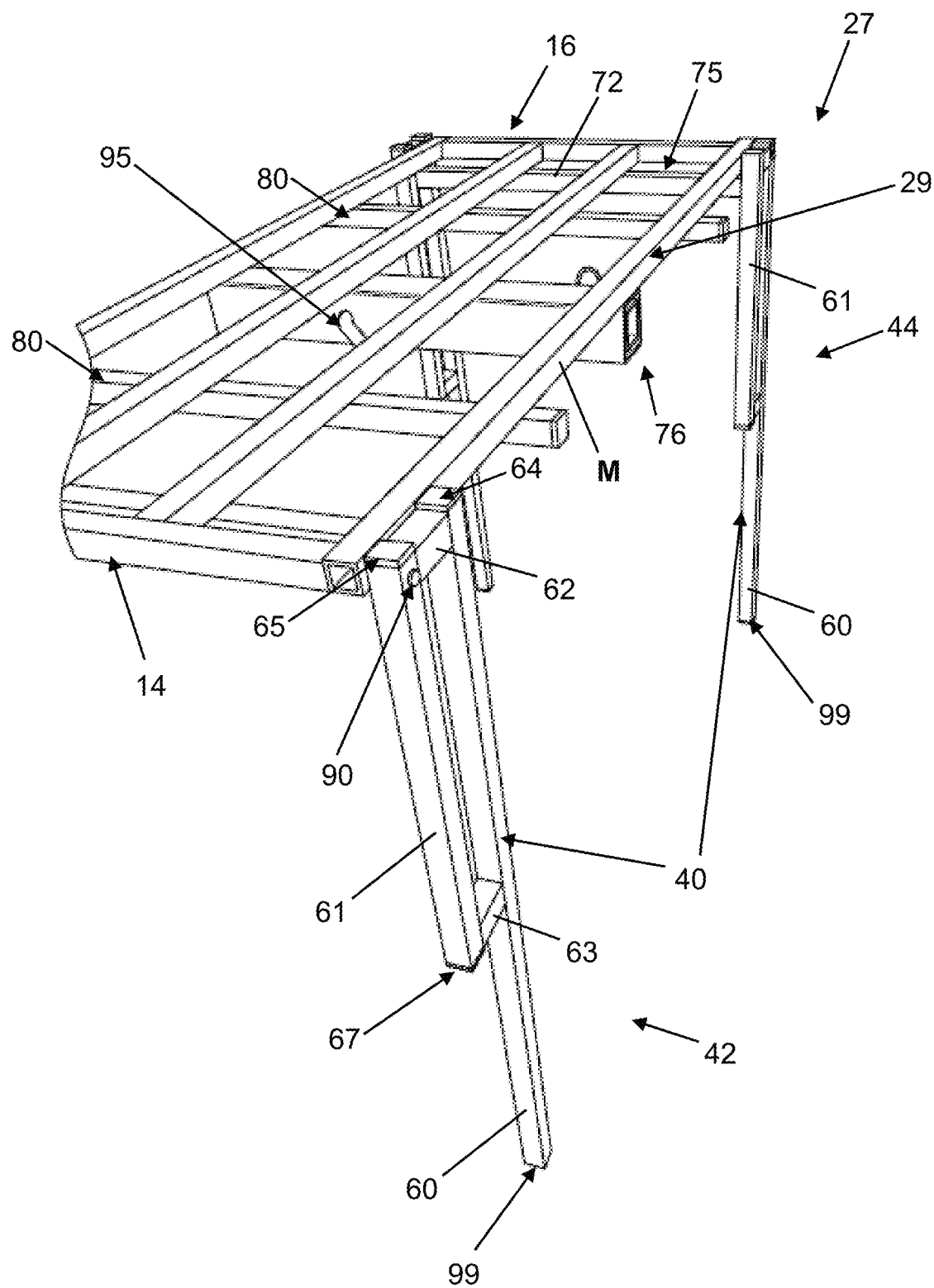
FIG. 2 is a partially cutaway right front perspective view of the device of FIG. 1.
Figure 3:
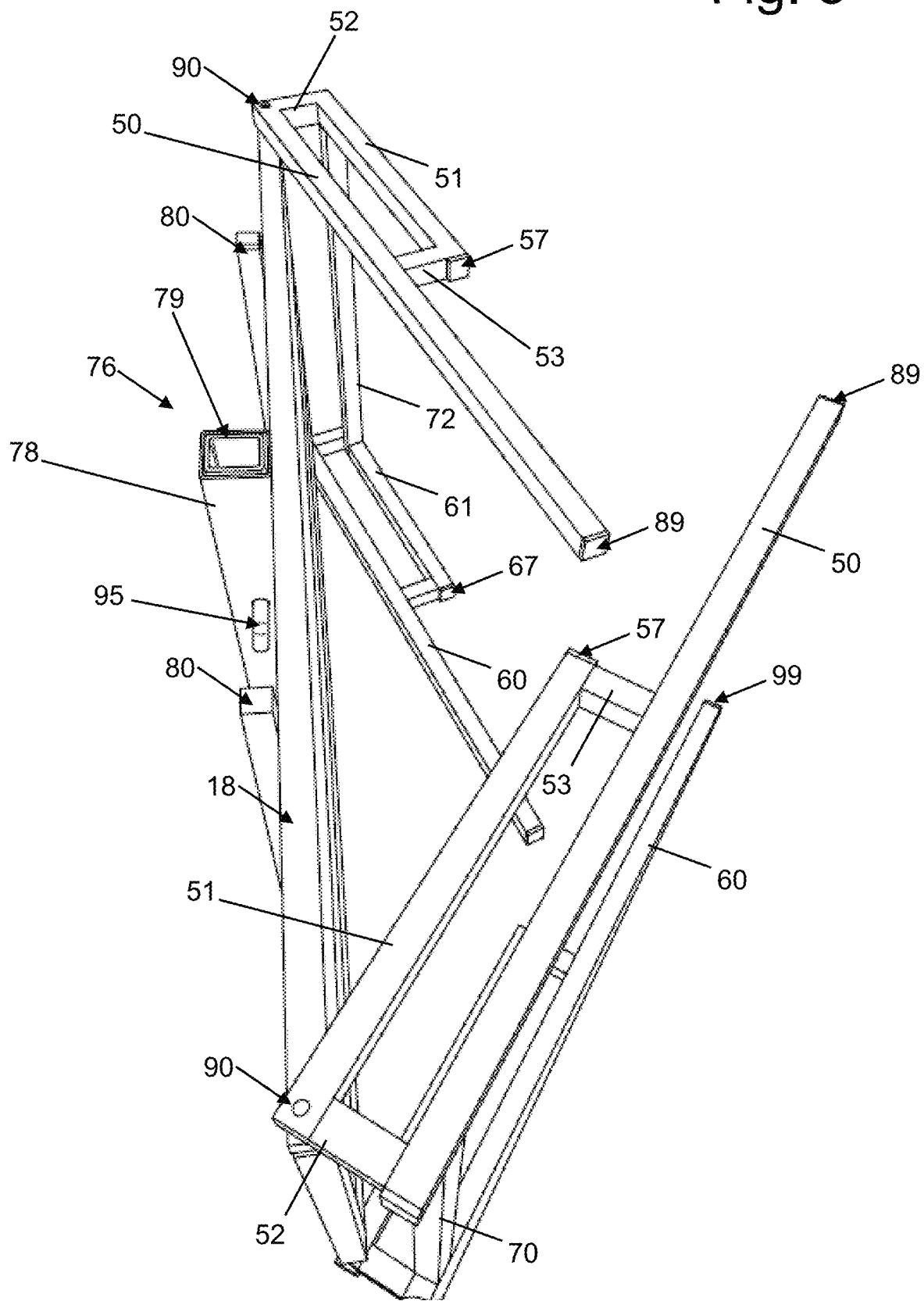
FIG. 3 is a perspective view of the device of FIG. 1 in the process of being folded or unfolded.

As shown in FIGS. 1 through 4, embodiments of the device 10 include a platform frame 12 having a first end 14, a second end 16, a front face 18 and a back face 20. In various embodiments, the platform frame 12 can be formed as spaced apart beams 22 extending from the front face 18 to the back face 20 along with end beams 24 at the first 14 and second 16 ends, for example. In various embodiments, the platform frame 12 can include a planar top (not shown) above, mounted to, on or in place of the beams 22, 24. The planar top facilitates carrying of articles on, or providing a table-top type surface as a substantially flat, level surface during operation. The platform frame 12 has a perimeter formed by beams 22, 24 labeled as edge segments J, K, L and M, as shown in FIGS. 1 and 2.

As further shown in the embodiments of FIGS. 1 through 4, the device 10 includes a front rail 30 and a back rail 40. The front rail 30 includes a first front rail segment 32 and a second front rail segment 34. The first front rail segment 32 can be rotatably and/or removably secured to the platform frame 12 proximate the first end 14 of the platform frame 12, and the second front rail segment 34 can be rotatably and/or removably secured to the platform frame 12 proximate the second end 16 of the platform frame 12. The back rail 40 includes a first back rail segment 42 and a second back rail segment 44. The first back rail segment 42 can be rotatably and/or removably secured to the platform frame 12 proximate the first end 14 of the platform frame 12, and the second back rail segment 44 can be rotatably and/or removably secured to the platform frame 12 proximate the second end 16 of the platform frame 12. Rotation of these elements can be provided using a connector element 90 such as a rod or pin inserted through the element into the platform frame 19, as shown in FIGS. 1 and 2, for example. In various embodiments, the connector element 90 can extend through openings formed in two or more elements such as rail segments 32, 34, 42, 44 and platform frame 12 to create a securing link.

According to various embodiments, the first front rail segment 32 is formed substantially in the shape of a lower case "h" letter, with parallel support segments 50, 51 and parallel bracing segments 52, 53. In embodiments, support segment 50 has a greater length than support segment 51. Bracing segment 52 is positioned between support segments 50, 51 at or proximate the first ends 54, 55 of the support segments 50, 51, respectively. Bracing segment 53 is positioned between support segments 50, 51 at or proximate a second end 57 of the shorter support segment 51. The second front rail segment 34 can be formed substantially similarly to the first front rail segment 32, with an initial support segment 50 that has a greater length than a secondary support segment 51. According to various embodiments, the first back rail segment 42 is also formed substantially in the shape of a lower case "h" letter, with parallel support segments 60, 61 and parallel bracing segments 62, 63. In embodiments, support segment 60 has a greater length than support segment 61. Bracing segment 62 is positioned between support segments 60, 61 at or proximate the first ends 64, 65 of the support segments 60, 61, respectively. Bracing segment 63 is positioned between support segments 60, 61 at or proximate a second end 67 of the shorter support segment 61. The second back rail segment 44 can be formed substantially similarly to the first back rail segment 42. Segments 50, 51, 52, 53 of first front rail segment 32 and second front rail segment 34 can be formed as a single, unitary, monolithic component or may be connected as two or more separable components. Similarly, segments 60, 61, 62, 63 of first back rail segment 42 and second back rail segment 44 can be formed as a single, unitary, monolithic component or may be connected as two or more separable components. It will be understood that segments 50 and 51, and also segments 60 and 61, can be of the same length in different embodiments of the present disclosure.

Figure 4:
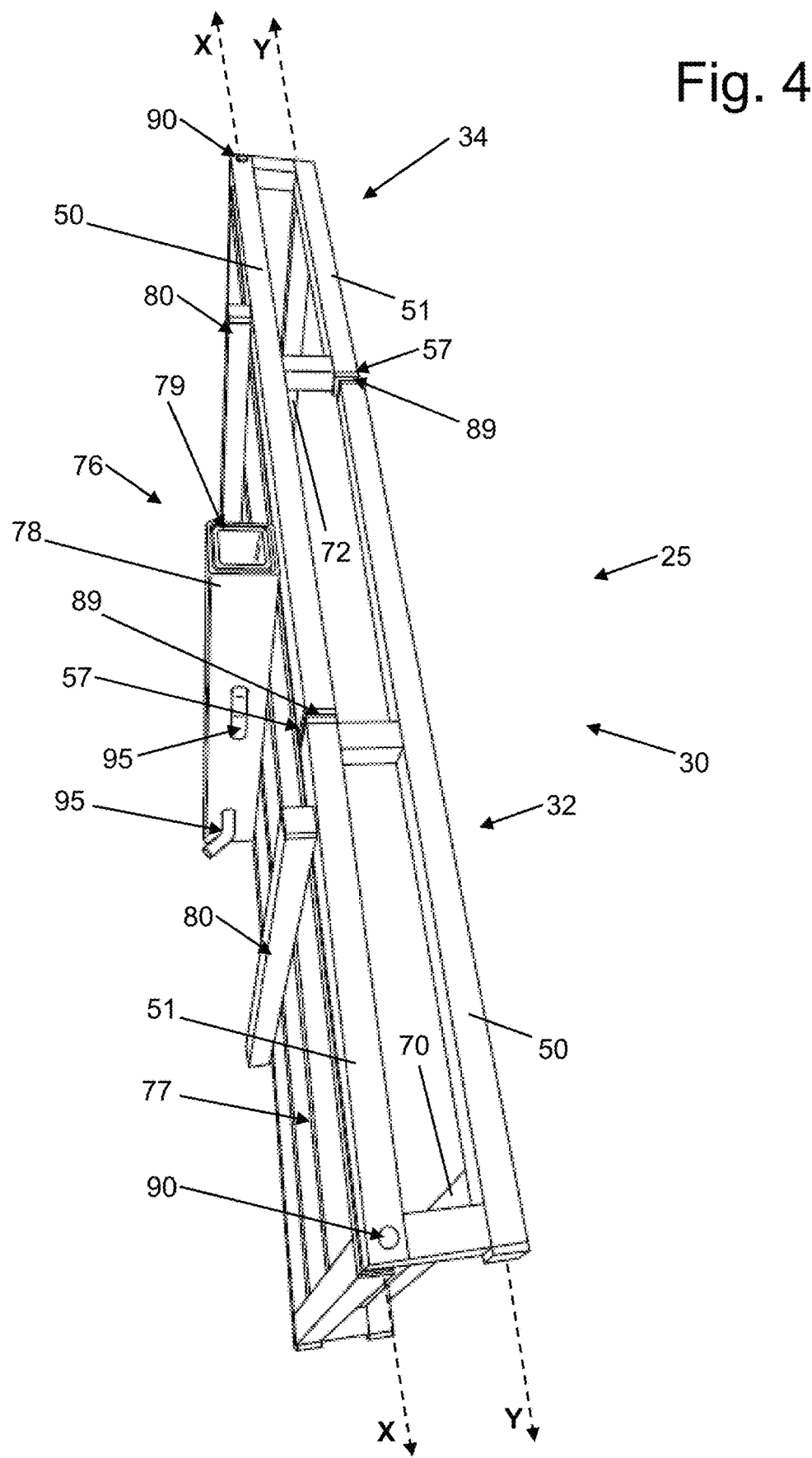
FIG. 4 is a bottom perspective view of the device of FIG. 1 wherein the rail segments are in the carrier configuration.

It will be appreciated that the first 32 and second 34 front rail segments and the first 42 and second 44 back rail segments can be rotatable between a wall position shown generally at 25 in FIG. 4 along the front 18 and back 20 faces, respectively, of the platform frame 12 and a leg position shown generally at 27 in FIGS. 1 and 2, where the first front rail segment 32 and the first back rail segment 42 are proximate end 14 of the platform frame 12 and where the second front rail segment 34 and the second back rail segment 44 are proximate end 16 of the platform frame 12. The device 10 is in a table-like position when the rail segments are in the leg position 27. As shown in FIGS. 1 and 2, in the leg position 27, the first front rail segment 32 and first back rail segment 42 extend downwardly from the platform frame 12 with the first ends 54, 55 of the support segments 50, 51, respectively, of the first front rail segment 32 and the first ends 64, 65 of the support segments 60, 61, respectively, of the first back rail segment 42 being substantially co-planar with the top surfaces of edge segments J, K, L and M of the platform frame 12. The second front rail segment 34 and second back rail segment 44 are situated similarly to segments 32, 42 in the leg position 27. In various embodiments, front rail segments 32, 34 are rotatably secured on the outside face 28 of edge segment L of the platform frame 12, and back rail segments 42, 44 are rotatably secured on the outside face 29 of edge segment M of the platform frame 12. Further, the first front rail segment 32 and the first back rail segment 42 can be secured to a first end rail 70. The second front rail segment 34 and the second back rail segment 44 can be secured to a second end rail 72. The end rails 70, 72 have a top surface 75 which can engage the bottom side 77 of the platform frame 12 when the rail segments 32, 34, 42, 44 are in the leg position 27. In this way, when the rail segments 32, 34, 42, 44 are rotated into the leg position 27, the end rails 70, 72 engage the platform frame 12 so as to prevent over-rotation and maintain the device 10 in the table position (i.e., with rail segments in the leg position 27).

It will be appreciated that the bracing segments 52, 53 provide stability to the support segments 50, 51 and bracing segments 62, 63 provide stability to the support segments 60, 61. Bracing segments 52, 53, 62, 63 also provide an additional barrier to cargo slippage when the rail segments 32, 34, 42, 44 are in the wall position 25. The support segments 50, 51 can be arranged to be substantially parallel and the support segments 60, 61 can be arranged to be substantially parallel for strength of support and ease of operation, with the gap between segment pairs 50, 51 and 60, 61 creating space for manual handling of the device 10.

As shown in FIGS. 1 through 4, the longer support segments 50 and 60 of each of the rail segments 32, 34, 42, 44 are positioned closer to the second end 16 of the device 10 than the shorter support segments 51, 61 when the rail segments 32, 34, 42, 44 are in the leg position 27. Further, a connector element 90 such as a rod or pin passes through the shorter segment 51, 61 of the first front rail segment 32 and first rear rail segment 42, respectively, whereas connector element 90 passes through the longer segment 50, 60 of the second front rail segment 34 and second rear rail segment 44, respectively. In this way, when the rail segments 32, 34, 42, 44 are rotated into the wall position 25 as shown in FIG. 4, the longer segments 50, 60 of the second front rail segment 34 and second rear rail segment 44, respectively, are maintained adjacent platform frame 12 (i.e., adjacent surfaces 28, 29, respectively), and the shorter segments 51, 61 of the first front rail segment 32 and the first rear rail segment 42 are maintained adjacent platform frame 12 (i.e., adjacent surfaces 28, 29, respectively). Segment 50 of rail segment 34 and segment 51 of rail segment 32 are thus linearly aligned along line X-X (see FIG. 4), and segment 60 of rail segment 44 and segment 61 of rail segment 34 are also linearly aligned. In addition, segment 50 of rail segment 32 and segment 51 of rail segment 34 are linearly aligned along line Y-Y (see FIG. 4) and form a top wall barrier 100 when in the wall position 25. Similarly, segment 61 of rail segment 42 and segment 60 of rail segment 44 are linearly aligned and form another top wall barrier 102 when in the wall position 25. In various embodiments, ends 89 of longer segments 50 connect in a friction fit with respective ends 57 of the shorter segments 51 of the first and second front rail segments 32, 34. Similarly, ends 99 of longer segments 60 connect in a friction fit with respective ends 67 of the shorter segments 61 of the first and second rear rail segments 42, 44. In various other embodiments, there is no friction fit as between these ends 89, 57 and 99, 67 and these ends just closely align. In such embodiments, a connector such as a clasp, rod, clip, magnet or other similar item can assist in retention.

As shown in FIGS. 1, 2 and 4, it will be appreciated that the wall position 25 of the front 30 and back 40 rails can be substantially perpendicular to the leg position 27, which facilitates both sturdiness of the device 10 in the leg position 27 and compactness of the device 10 in the wall position 25.

As shown in FIGS. 1 through 4, in various embodiments, a hitch connector assembly 76 is secured to the platform frame 12. The hitch connector assembly 76 can include one or more support beams 78 and a hitch connector 79 that is movable with respect to the one or more support beams 78. In various embodiments, the hitch connector 79 is slidably or telescopically secured to and/or within the one or more support beams 78. The slidable operation can be provided via a nested arrangement that permits telescopic operation of the hitch connector 79 as it moves between extended and retracted positions with respect to the support beam(s) 78. The hitch connector 79 can also be movably secured to the platform frame 12 in the sense that it is removable and then re-securable in different positions depending upon whether it is being employed with a trailer receiver tube of a vehicle or stored within the frame of the platform for use as a table or work area, for example. In various other embodiments, the hitch connector can be pivotably secured to the one or more support beams 78. Alternatively, the hitch connector 79 may be secured to and pivot in relation to the platform frame 12. The hitch connector 79 can also be secured in the extended and/or retracted positions via one or more connector elements 95. The connector element(s) 95 can be embodied in many forms, including, without limitation, a cotter pin, a spring-loaded detent, a cylindrical pin with a ring for insertion of a finger or other item, a latch and hook, magnets, clips and other similar attachment mechanisms. In embodiments where the connector element 95 is a cylindrical pin, the pin can extend through mating openings in the hitch connector 79 and support beam(s) 78.

In various embodiments as shown in FIGS. 1 through 4, one or more cross beams 80 can be secured to the bottom side 77 of the platform frame 12. Such cross beam(s) 80 provide support to the platform frame 12, among other things. In various embodiments, the cross beam(s) 80 extend beyond the perimeter of the platform frame 12, and specifically beyond the front face 18 and back face 20 of the platform frame. As shown in FIG. 1, the front face 18 can be considered the outer face of edge segment L, and the back face 20 can be considered the outer face of edge segment M. The cross beam(s) 80 provide a stopping surface for the front 32, 34 and rear 42, 44 rail segments when these rail segments are rotated into the wall position 25.

As shown in FIG. 4, in various embodiments, end rails 70, 72 provide an upper wall barrier at the respective ends 14, 16 of the platform frame 12 to restrict cargo from sliding off of the upper surface of the platform frame 12 when the rail segments are in the wall position 25. According to various embodiments, the end rails 70, 72 are not aligned with the perimeter edge segments J, K of the platform frame 12 but are positioned inwardly of the perimeter of the platform frame 12, and are thus mounted on an interior edge of rail segments 32, 34, 42, 44, which can assist in positioning against the platform frame 12 during operation in the leg position 27 as described elsewhere herein. In embodiments, end rail 70 is secured to longer rail 50 of first front rail segment 32 and longer rail 60 and first back rail segment 42, and end rail 72 is secured to shorter rail 51 of second front rail segment 34 and shorter rail 61 of second back rail segment 44.

As shown in the drawings and described herein, according to various embodiments, the first front rail segment 32 and the first back rail segment 42 are rotatable at least 270 degrees about a first pivot axis generally aligned with perimeter edge segment K and/or end 14 of the platform 12, and the second front rail segment 34 and the second back rail segment 44 are rotatable at least 270 degrees about a second pivot axis generally aligned with perimeter edge segment J and/or end 16 of the platform 12.

In operation, the device 10 can be employed as a vehicle roof rack where the hitch connector 79 is in the retracted position and the rail segments 32, 34, 42, 44 are in the wall position 25 as shown in FIG. 4. Where no friction fit is provided as described elsewhere herein, connector elements 95 can be employed to secure the rail segments 32, 34, 42, 44 in place in the wall position. The connector elements 95 can be positioned through one or more elements of each rail segment 32, 34, 42, 44 and the platform frame 12 as described elsewhere herein. Should it be desired to employ the device in connection with a trailer receiver tube of a vehicle, the hitch connector 79 can be moved to the extended position and secured in place using a connector element 95, for example.

When the device 10 is to be employed as a flat surface, table-type device, any connector element 95 can be disconnected, where applicable. If the hitch connector 79 is in the extended position, it can be moved to a retracted position. Otherwise, the rail segments 32, 34, 42 and 44 can be moved to the leg position 27 as shown in FIGS. 1 and 2, whereupon the end rails 70, 72 can matingly engage the platform bottom surface 77 and/or the platform frame 12. The rail segments 32, 34, 42, 44 can then be further secured in place using connector elements if and as desired.

It will be appreciated that the components of the presently disclosed device can be fabricated from various types of materials, including aluminum, steel, carbon fiber, plastic and/or other suitable materials consistent with the transportation and recreational environments in which the device can operate.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:
1. An apparatus, comprising:
a platform frame comprising a perimeter, a first end, a second end, a front face and a back face;
a front rail comprising a first front rail segment and a second front rail segment, wherein the first front rail segment comprises first and second support segments, wherein the first support segment is longer than the second support segment, wherein the second front rail segment comprises initial and secondary support segments, wherein the initial support segment has a greater length than the secondary support segment, wherein the second support segment of the first front rail segment is rotatably secured to the platform frame, and wherein the initial support segment of the second front rail segment is rotatably secured to the platform frame; and
a back rail comprising a first back rail segment and a second back rail segment, wherein the first back rail segment comprises first and second support segments, wherein the first support segment of the first back rail segment is longer than the second support segment of the first back rail segment, wherein the second back rail segment comprises initial and secondary support segments, wherein the initial support segment of the second back rail segment has a greater length than the secondary support segment of the second back rail segment, wherein the second support segment of the first back rail segment is rotatably secured to the platform frame, and wherein the initial support segment of the second back rail segment is rotatably secured to the platform frame.

2. The apparatus of claim 1, further comprising:
a first end rail secured to the first front rail segment and the first back rail segment; and
a second end rail secured to the second front rail segment and the second back rail segment.

3. The apparatus of claim 2, wherein the first end rail is secured to the first support segment of the first front rail segment and is further secured to the first support segment of the first back rail segment.

4. The apparatus of claim 3, wherein the second end rail is secured to the secondary support segment of the second front rail segment and is further secured to the secondary support segment of the second back rail segment.

5. The apparatus of claim 1, wherein each of the first and second support members and each of the initial and secondary support members has an end, and wherein at least the end of the first support member of the first front rail segment engages the end of the secondary support member of the second front rail segment in a friction fit when the first and second front rail segments are rotated into a wall position.

6. The apparatus of claim 1, further comprising a cross beam secured to a bottom side of the platform frame.

7. The apparatus of claim 6, wherein the cross beam extends beyond the perimeter of the platform frame.

8. The apparatus of claim 6, wherein the cross beam extends beyond the front face and the back face of the platform frame.

9. The apparatus of claim 1, further comprising a hitch assembly and a pair of cross beams secured to a bottom side of the platform frame.

10. An apparatus, comprising:
a platform frame comprising a perimeter, a first end, a second end, a front face and a back face;
a front rail comprising a first front rail segment and a second front rail segment, wherein each of the first and second front rail segments is rotatable between a leg position and a wall position, wherein the first front rail segment comprises first and second support segments, wherein the first support segment is longer than the second support segment, wherein the second front rail segment comprises initial and secondary support segments, wherein the initial support segment has a greater length than the secondary support segment, wherein the first support segment of the first front rail segment is closer to the first end of the platform frame than the second support segment of the first front rail segment when in the leg position, and wherein the initial support segment of the second front rail segment is closer to the first end than the secondary support segment of the second front rail segment when in the leg position; and
a back rail comprising a first back rail segment and a second back rail segment, wherein each of the first and second back rail segments is rotatable between a leg position and a wall position, wherein the first back rail segment comprises first and second support segments, wherein the first support segment of the first back rail segment is longer than the second support segment of the first back rail segment, wherein the second back rail segment comprises initial and secondary support segments, wherein the initial support segment of the second back rail segment has a greater length than the secondary support segment of the second back rail segment, wherein the first support segment of the first back rail segment is closer to the first end of the platform frame than the second support segment of the first back rail segment when in the leg position, and wherein the initial support segment of the second back rail segment is closer to the first end than the secondary support segment of the second back rail segment when in the leg position.

11. The apparatus of claim 10, further comprising:
a first end rail secured to the first front rail segment and the first back rail segment; and
a second end rail secured to the second front rail segment and the second back rail segment.

12. The apparatus of claim 11, wherein the first end rail is secured to the first support segment of the first front rail segment and is further secured to the first support segment of the first back rail segment.

13. The apparatus of claim 12, wherein the second end rail is secured to the secondary support segment of the second front rail segment and is further secured to the secondary support segment of the second back rail segment.

14. The apparatus of claim 10, wherein each of the first and second support members and each of the initial and secondary support members has an end, and wherein at least the end of the first support member of the first front rail segment engages the end of the secondary support member of the second front rail segment in a friction fit when the first and second front rail segments are rotated into a wall position.

15. The apparatus of claim 10, further comprising a cross beam secured to a bottom side of the platform frame.

16. The apparatus of claim 15, wherein the cross beam extends beyond the perimeter of the platform frame.

17. The apparatus of claim 15, wherein the cross beam extends beyond the front face and the back face of the platform frame.

18. The apparatus of claim 10, further comprising a hitch assembly and a pair of cross beams secured to a bottom side of the platform frame.

19. An apparatus, comprising:
a platform frame comprising a perimeter, a first end, a second end, a front face and a back face;
a front rail comprising a first front rail segment and a second front rail segment, wherein each of the first and second front rail segments is rotatable between a leg position and a wall position;
a back rail comprising a first back rail segment and a second back rail segment, wherein each of the first and second back rail segments is rotatable between a leg position and a wall position;
at least two cross beams secured to a bottom side of the platform frame, wherein each of the at least two cross beams extends beyond the front face and the back face of the platform frame.

20. The apparatus of claim 19, wherein each of the first and second front rail segments and each of the first and second back rail segments comprises a support member having an end, wherein the end of the support member of the first front rail segment engages the end of the second front rail segment in a friction fit when the first and second front rail segments are rotated into the wall position, and wherein the end of the support member of the first back rail segment engages the end of the support member of the second back rail segment in a friction fit when the first and second back rail segments are rotated into the wall position.

* * * * *